US010223133B2

(12) United States Patent
Chatterton et al.

(10) Patent No.: US 10,223,133 B2
(45) Date of Patent: *Mar. 5, 2019

(54) METHODS AND SYSTEMS FOR DETECTING A USER AND INTELLIGENTLY ALTERING USER DEVICE SETTINGS (71) Applicant: PAYPAL, INC., San Jose, CA (US)

(72) Inventors: Geoffrey W. Chatterton, San Jose, CA (US); Ramaneek Khanna, San Jose, CA (US); Timothy C. Nichols, San Jose, CA (US)

(73) Assignee: PayPal, Inc., San Jose, CA (US)

(*) Notice: Subject to any disclaimer, the term of this patent is extended or adjusted under 35 U.S.C. 154(b) by 37 days.

This patent is subject to a terminal disclaimer.

(21) Appl. No.: 15/287,396

(22) Filed: Oct. 6, 2016

(65) Prior Publication Data

US 2017/0024229 A1    Jan. 26, 2017

Related U.S. Application Data (63) Continuation of application No. 14/014,178, filed on Aug. 29, 2013, now Pat. No. 9,483,628.

(51) Int. Cl.
| G06F 9/00 | (2006.01) |
| G06F 9/24 | (2006.01) |
| G06F 15/177 | (2006.01) |
| G06F 9/445 | (2018.01) |
| G06F 21/31 | (2013.01) |
| G06F 3/041 | (2006.01) |

(52) U.S. Cl.
CPC .......... *G06F 9/4451* (2013.01); *G06F 3/0414* (2013.01); *G06F 21/31* (2013.01); *G06F 21/316* (2013.01)

(58) Field of Classification Search
CPC .......................................................... G06F 9/44
See application file for complete search history.

(56) References Cited

U.S. PATENT DOCUMENTS

| 7,564,369 | B1 | 7/2009 | Adams et al. |
| 8,593,418 | B2 | 11/2013 | Blow et al. |
| 9,001,062 | B2 | 4/2015 | Ito et al. |
| 2006/0078174 | A1 | 4/2006 | Russo |
| 2007/0036400 | A1 | 2/2007 | Watanabe et al. |
| 2008/0010656 | A1 | 1/2008 | Cho |

(Continued)

FOREIGN PATENT DOCUMENTS

WO    WO 2013/062771    5/2013

*Primary Examiner* — Mohammed H Rehman
(74) *Attorney, Agent, or Firm* — Haynes and Boone, LLP (57) ABSTRACT Systems and methods according to one or more embodiments are provided for detecting or recognizing a user and intelligently altering or adjusting user device settings appropriate for the detected user. In an embodiment, a method comprises detecting, electronically by a processor, a first user interacting with a user device via a user input interface of the user device; determining, electronically by the processor, one or more characteristics associated with a primary user of the user device; determining, electronically by the processor, the first user is not the primary user based at least in part on comparing interactions of the first user with the user device and the one or more characteristics associated with the primary user of the user device; and altering one or more settings of the user device.

20 Claims, 3 Drawing Sheets (56) References Cited

U.S. PATENT DOCUMENTS

| | | |
|---|---|---|
| 2008/0092245 A1 | 4/2008 | Alward et al. |
| 2010/0083371 A1 | 4/2010 | Bennetts et al. |
| 2010/0302212 A1* | 12/2010 | Weber .................. G06F 3/0488 345/178 |
| 2010/0321289 A1 | 12/2010 | Kim et al. |
| 2011/0072452 A1 | 3/2011 | Shimy et al. |
| 2011/0109431 A1 | 5/2011 | Bragagnini et al. |
| 2012/0218231 A1 | 8/2012 | Slaby et al. |
| 2012/0235938 A1 | 9/2012 | Laubaach |
| 2013/0061180 A1* | 3/2013 | Dongen .............. G06F 3/04883 715/847 |
| 2013/0109369 A1 | 5/2013 | Forutanpour et al. |
| 2013/0111527 A1 | 5/2013 | Poniatowski et al. |
| 2013/0129161 A1 | 5/2013 | Goel |
| 2013/0181902 A1 | 7/2013 | Hinckley et al. |
| 2013/0183944 A1 | 7/2013 | Mozer et al. |

* cited by examiner

METHODS AND SYSTEMS FOR DETECTING A USER AND INTELLIGENTLY ALTERING USER DEVICE SETTINGS

CROSS REFERENCE TO RELATED APPLICATION

This application is a continuation of U.S. patent application Ser. No. 14/014,178, filed Aug. 29, 2013, which is hereby incorporated by reference in its entirety.

BACKGROUND

Technical Field

Embodiments of the present disclosure generally relate to detecting a user and intelligently altering user device settings.

Related Art

Currently, user devices such as smart phones, tablets, laptops, etc., may provide users with the ability to perform many different actions such as accessing many types of content, conducting transactions such as purchases, bidding, etc. However, some actions such as accessing certain types of content may be inappropriate for some users such as children or minors. In such cases, while parents may try to supervise and limit the types of actions children may perform on their user devices, for example, limit the content their children can access, children may still be able to perform such actions. For example, children may still be able to access inappropriate content by accident or without the parents' knowledge.

BRIEF DESCRIPTION OF THE DRAWINGS

Like reference numerals are used to identify like elements illustrated in one or more of the figures, wherein showings therein are for purposes of illustrating embodiments of the present disclosure and not for purposes of limiting the same.

Embodiments of the disclosure and their advantages are best understood by referring to the detailed description that follows.

DETAILED DESCRIPTION

The following description sets forth specific details describing certain embodiments. It should be apparent to a person of skill in the art, however, that the embodiments described herein may be practiced without some or all of these specific details. The embodiments described herein are for illustrative purposes and are not meant to be limiting. A person of skill in the art may realize other material that, although not specifically described herein, is within the scope and spirit of the present disclosure.

According to one or more embodiments of the present disclosure, a user may interact with a user device via a user input interface such as a touch screen. The user device may determine certain characteristics of a user that is using the user device. In this regard, the user device may detect when a new or different user has begun using the user device. As a result, user device setting such as security settings may be altered or adjusted according to the new or different detected user.

In various embodiments, the user device may detect new or different users by determining or analyzing certain characteristics of a new or different user including, for example, determining the size of an object such as a user's extremity (e.g., the user's finger) that is performing actions on the user device, pressure patterns, applications in use, facial or voice recognition, etc. For example, the user device may detect whether the user is an adult or a child, or that a child has begun using a parent's user device. In that regard, small touch points or small area traces on the user input interface may indicate that a child is using the device while larger touch points or larger area traces may indicate that an adult is using the device.

Once the user device detects that a new or different user is using the user device by determining characteristics of the new or different user that may correspond to certain types of users, for example, a small finger of a child versus a larger finger of an adult, then one or more settings of the user device may be changed or adjusted automatically. That is, if the user device detects that a new or different user is using the user device, this triggers the user device setting changes. In this regard, the user device settings may be changed or adjusted in a way that is appropriate for the new or different user. For example, security settings may be adjusted so that content may be restricted or only certain content may be displayed on the user device if it is determined that a child is using the user device. Or, in some embodiments, different authentication may be required depending on the detected user. For example, one result of a change of a security setting may be that the user needs to be re-authenticated before certain actions are performed such as conducting transactions, e.g., before purchases can be made.

According to one or more embodiments, an application may be downloaded on a user device. The application, as described above, may detect a new or different user of the user device, and as a result, intelligently alter or adjust settings according to the user using the user device. Results of a setting adjustment may include, for example, adjusting the settings in a different way if the user device detects that a user other than a primary user (e.g., the owner of the user device) such as a child has begun using the user device, re-authenticating the user before performing certain actions on the user device, or any other appropriate setting changes depending on the detected user. The application may be provided by a remote location server such as a payment provider server, e.g., PayPal®, Inc., or eBay®, Inc. of San Jose, Calif., USA. In other embodiments, the application may be provided by a merchant server, a financial institution server, or any other appropriate entity server.

Figure 1:
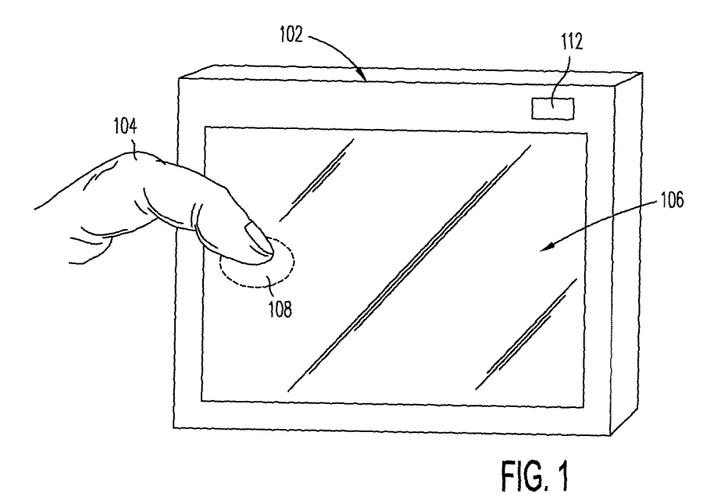
FIG. 1 is a diagram illustrating an object touching a user input interface of a user device according to an embodiment of the present disclosure.

Referring now to the drawings wherein the showings are for purposes of illustrating embodiments of the present disclosure only, and not for purposes of limiting the same, FIG. 1 is a diagram illustrating an object touching a user input interface of a user device according to an embodiment of the present disclosure.

FIG. 1 illustrates a user device 102 that includes a user input interface 106 such as a touch sensitive screen, which a user may use to interact with user device 102. As illustrated in the embodiment of FIG. 1, the user may interact with user device 102 by contacting (e.g., touching, pressing, pinching, tapping, swiping, etc.) a portion or an area 108 of user input interface 106 with an object 104 such as a finger. In various embodiments, object 104 may be a hand, different fingers, another extremity of the user, or any other appropriate object associated with the user.

In one or more embodiments, user device 102 may include a user capturing component 112, for example, a front-facing camera, an audio or voice recognition device, a gesture recognition component, or any other device that may aid in user recognition or identification. User capturing component 112 may capture user identification data such as an image, voice, gestures, etc. of a user that is using user device 102. In some embodiments, user gestures captured by capturing component 112 may be associated with a user's specific key, password, secret code etc. that is only known or is specific to the user. The user device 102 may then process and use the user identification data according to one or more embodiments as will be described herein.

User device 102 may be implemented using any appropriate combination of hardware and/or software configured for wired and/or wireless communication over a network. For example, in one embodiment, user device 102 may be implemented as a mobile device of a user in communication with a network such as the Internet or another network. In other embodiments, user device 102 may be implemented as a tablet, a personal computer, a wireless telephone, a smart phone, a personal digital assistant (PDA), a key fob, a smart card, a notebook computer, a game console, a digital video recorder (DVR), and/or other types of computing devices or network devices. Furthermore, user device 102 may be enabled for NFC, Bluetooth, online, infrared communications and/or other types of communications.

User device 102 may include one or more processors coupled to one or more memories configured to process downloading, installing and/or running of applications from one or more remote location servers. User device 102 may include various applications as may be desired in particular embodiments to provide desired features to user device 102. For example, in various embodiments, applications may include security applications for implementing client-side security features, programmatic client applications for interfacing with appropriate application programming interfaces (APIs) over a network, or other types of applications.

User device 102 may further include one or more user identifiers, which may be implemented, for example, as operating system registry entries, cookies associated with a browser application, identifiers associated with hardware of user device 102, or other appropriate identifiers. In one embodiment, a user identifier may be used by a remote location server to associate user device 102 (or correspondingly a user) with a particular account maintained by the remote location server.

User device 102 may include one or more processors, memories, and other appropriate components for executing instructions such as program code and/or data stored on one or more computer readable mediums to implement the various applications, data, and methods described herein. For example, such instructions may be stored in one or more computer readable mediums such as memories or data storage devices internal and/or external to various components of the system, and/or accessible over a network, which may be implemented as a single network or a combination of multiple networks. For example, in various embodiments, a network may include the Internet or one or more intranets, landline networks, wireless networks, and/or other appropriate types of networks.

Figure 2:
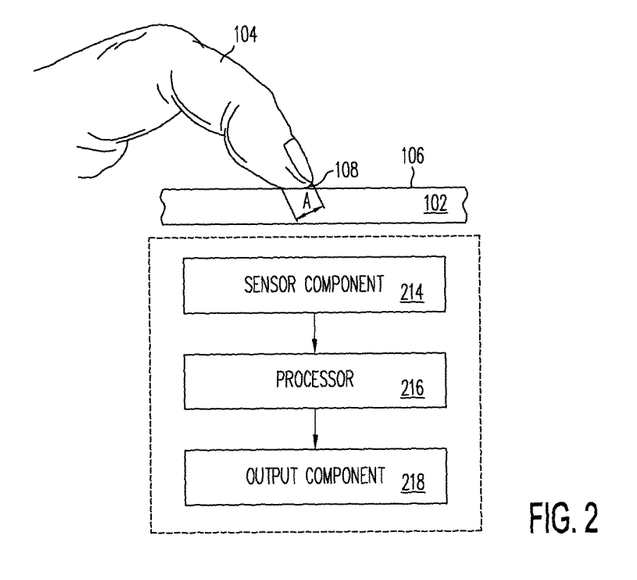
FIG. 2 is a diagram illustrating components of a user device that may detect a user and intelligently alter user device settings according to an embodiment of the present disclosure.

Referring now to FIG. 2, a diagram illustrates components of a user device that may detect a user and intelligently alter user device settings according to an embodiment of the present disclosure. The user device components illustrated in FIG. 2 may be included in user device 102 illustrated in FIG. 1 according to an embodiment.

In the embodiment of FIG. 2, an object 104 such as a fingertip of a user may be used to interact with a user device 102, for example, by contacting or touching a portion or an area 108 of a user input interface 106 such as a touch screen of user device 102. User device 102 may include various components including a sensor component 214, a processor 216 and an output component 218.

Sensor component 214 may sense a signal generated in response to an input such as a contact (i.e., pressing, touching, pinching, tapping, swiping, etc.) by object 104 on user input interface 106. For example, the device may determine an object's size, e.g., a fingertip size that corresponds to contact area 108, to figure out whether an adult (i.e., large-fingered user) or a child (i.e., small-fingered user) is using user device 102. In one example, contact area 108 may have a dimension "A" measured across the contact area, which correlates to the object's size at the point or area of contact. In this case, a small dimension "A", for example, less than about a half an inch, may indicate that the object is small and may belong to a child. A larger dimension "A", for example, half an inch or larger, may indicate that the object may belong to an adult.

In an embodiment, sensor component 214 may include a capacitive sensor. Capacitive sensors and their APIs may generally all express relative capacitance. In that regard, processor 216 may map the relative capacitance to a contact (e.g. pressure) sensed on user input interface 106. For example, the more pressure sensed may be equivalent to a bigger contact patch (e.g., corresponding to contact area 108). Generally, capacitive sensors work by directly measuring capacitance between a driven voltage on or near a surface user input interface 106 (e.g., on or near the surface of a touch screen) and the contacting object (e.g. a user's finger). Assuming that objects, for example fingers, have basically the same composition and are about the same distance from the sensor (i.e., touching the screen), the amount of capacitance measured will be proportional to a surface area of the portion of the object (e.g., finger) that is contacting the user input interface (e.g. the touch screen).

In one or more embodiments, it may be possible for modern touch sensors to sense more information about the capacitance beyond just the absence or presence of an object and/or the amount of capacitance. For example, in certain systems such as Android® systems, applications are allowed to read information from touch events including not just a two dimensional (x, y) location of the touch, but also the length of the major and minor axes of an ellipse circumscribing the sensed touch event as well as synthesized information such as "pressure" (not actually pressure in this case, but rather a floating point value that varies with the total area of a sensed touch event). By binning and analyzing different contacts or gestures (e.g., single tap vs. horizontal swipe vs. vertical swipe vs. pinch), it may be possible to compare the touch size profile of a known user to a current user and decide whether they are consistent or not. In embodiments herein, model generation and runtime analysis of touch data or information may be done using well-known and suitable machine learning and pattern-matching techniques such as neural networks. An output component 218 may output a measurement corresponding to the contact sensed (e.g. pressure), or, in other embodiments, to a region, an area, or a radius of a circle or simply an absolute capacitance measurement.

In another embodiment, sensor component 214 may include one or more pressure sensors. Data from the pressure sensors may be used in an analysis, for example by processor 216, to determine whether a new user is operating the user device. In that regard, one user's pattern of pressure may be distinct from another user's pattern of pressure, for example, in the same way that different users may use different pen pressure when writing. Or, in another example, a child may exert less pressure than an adult when interacting via the user input interface.

While any individual contact on user input interface 106 such as pressure, touch, pinch, tap or swipe by an object may be harder or gentler (and thus produce a larger or smaller contact patch), according to embodiments herein, the user device may run background processes to look for overall patterns to determine contact patch pattern information, for example, to determine average and median contact patch sizes, the largest contact patch, what the overall patterns look like in a multi-touch gesture versus a single finger gesture, etc.

In embodiments where an overall pattern shifts too far, especially, for example after a screen is unlocked, after a period of non-use, etc., a processor such as processor 216 may use this pattern shift as an input to decide whether to require a more rigorous identification check or authentication of the user before allowing certain user actions to take place such as purchases, proceeding with a program, or using certain features.

As such, a user device according to one or more embodiments herein may run background or continuous authentication of a user. Advantageously, a frictionless service may be provided wherein users may not have to constantly be asked for identification or authentication information such as login data, or entering a PIN. Running background authentication of a user by looking for overall patterns that may indicate that the user has not changed, may result in the user not being asked for identification or authentication information such as a password.

In an example where a user device may be used by a parent or a child, the parent may tag individual applications as being for the child's use.

Referring back to FIG. 1, user device 102 may include a user capturing component 112. User capturing component 112 may be a camera, an audio or voice recognition device, a gesture recognition device, etc. Data captured by user capturing component 112 may be used to recognize or identify a user using the user device. Such data may be processed by processor 216 (in addition to an input sensed by sensor 214) to detect the user. For example, if the user device includes a front-facing camera, it may be used to recognize a child or an adult or any particular user such as the owner of the user device.

Figure 3:
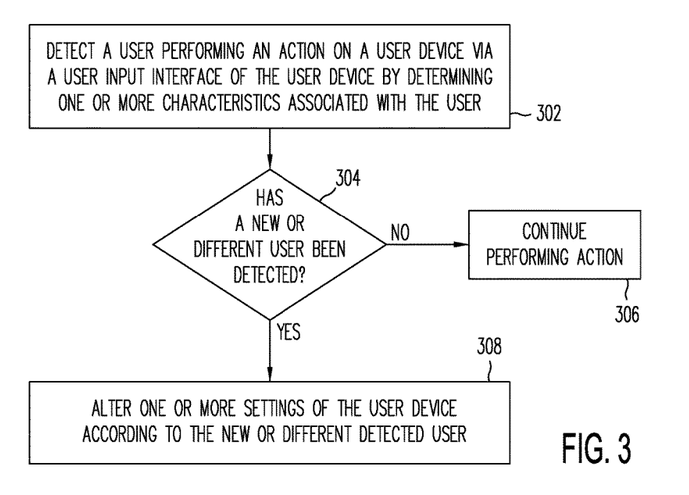
FIG. 3 is a flow diagram illustrating a method for detecting a user and adjusting user device settings according to an embodiment of the present disclosure.

Referring now to FIG. 3, a flow diagram illustrates a method for detecting a user and adjusting user device settings according to an embodiment of the present disclosure. The method of FIG. 3 may be implemented by the user device illustrated in FIG. 1 or 2 according to one or more embodiments.

In block 302, a user interacting via a user input interface with a user device to perform an action may be detected by determining one or more characteristics associated with the user. In that regard, a user may be recognized or identified, for example, to be a child, an adult or a specific user such as the owner of the user device. Characteristics associated with the user interacting with the user device may be determined, including for example, the size of a fingertip of the user contacting the user input interface (e.g., a touch sensitive screen). Such characteristics may indicate the identity of the user, for example, a small fingertip size (e.g., less than about half an inch across), a light pressure on the touch screen, etc. may indicate that the user is a child. A larger fingertip size (e.g., more than about half an inch), a stronger pressure on the touch screen, etc. may indicate that the user is an adult.

In various embodiments, the characteristics associated with the user may be complemented or confirmed by data captured by a user capturing component of the user device, for example a front-facing camera, a voice recognition device, a gesture recognition device, etc. In this regard, in addition to the user device recognizing a user that is performing an action or interacting via a user input interface (e.g., by determining a size of a user's extremity), the user device may also complement or confirm the identity of a user by recognizing an image of the user, the voice of the user, a gesture associated or only known to a particular user, etc.

In block 304, the system or application may determine whether a new or different user has been detected. As described above according to one or more embodiments, capacitance sensors, resistance sensors, pressure sensors, or any other appropriate type of sensors may sense and compare sensor information associated with particular users. For example, overall patterns for one user may be different than overall patterns for another user. In one instance, different users may have different contact patch sizes compared to average and median contact patch sizes (e.g., a first user may have a large contact patch while a new or different user may have a small contact patch). In another instance, different users may use different contact patterns, for example, one user may normally use multi-fingers on a contact surface (i.e., user input interface) versus another user may normally use a single finger on the contact surface. In this regard, a comparison of sensor data may occur when a shift in overall patterns occur, for example, after a user device restart, after a screen lockout, after a change of application, upon capturing a change of a gesture or an image, after a certain period of time or inactivity (e.g., after 30 minutes, after an hour, etc.), or periodically at certain time intervals (e.g., every 30 minutes, every hour, etc.).

In block 306, if a new or different user has not been detected, then the user may continue to perform the action on the user device.

In block 308, if a new of different user has been detected, then one or more settings of the user device may be altered according to the new or different detected user. For example, security settings may be altered or adjusted depending on who is using the user device. In one instance where the new or different detected user is a child using a parent's user device, the user device settings may be adjusted so that only appropriate content is presented, e.g., only "G"-rated content. In another instance where a new or different user is detected, security settings may be changed such that the new user needs to re-authenticate before transactions such as purchases may be made. In an example where the same user device may be used by a parent or a child, the parent may tag individual applications as being for the child's use.

Figure 4:
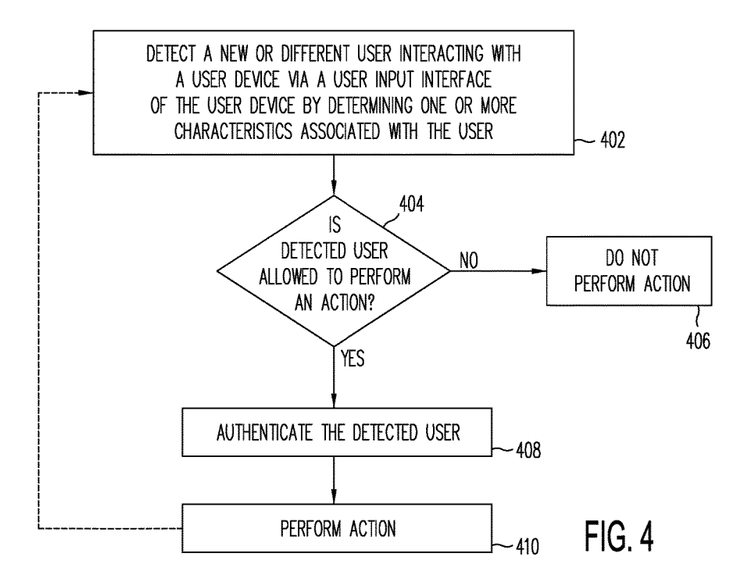
FIG. 4 is a flow diagram illustrating a method for detecting a user and authenticating the user according to an embodiment of the present disclosure.

Referring now to FIG. 4, a flow diagram illustrates a method for authenticating a user according to an embodiment of the present disclosure. The method of FIG. 4 may be implemented by the user device illustrated in FIG. 1 or 2 according to one or more embodiments. Also, in various embodiments, the method of FIG. 4 may be performed after a new or different user has been detected as described above with respect to the embodiment of FIG. 3.

In block 402, as described above according to one or more embodiments, a new or different user interacting via a user input interface with a user device may be detected by determining one or more characteristics associated with the user. Upon detecting that a new or different user is using the user device, user device settings may be changed according to the detected user. For example, one result may be a security change wherein the new or different user may need to be authenticated before performing certain actions.

In block 404, the user device (for example by processor 216 illustrated in the embodiment of FIG. 2) may determine whether the detected user is allowed to perform an action. A user of a user device may wish to perform one or more different actions as normally conducted on user devices including, for example, accessing certain media (e.g., websites, printed publications, TV shows, movies, etc.), playing a video game, accessing an email account, conducting transactions such as purchases, bidding, etc.

Users that may be allowed to perform an action may be determined based on various factors, for example, the user device may restrict the presentation of certain mature or otherwise inappropriate content to a user that is detected to be a child. In another example, the user device may not allow a user using the user device that is detected to be a child or a user other than the owner of the user device to conduct transactions such as bidding, making purchases (in some examples perhaps over a certain amount, e.g., above $10, $20, etc.), or the like.

In block 406, if the detected user is not allowed to perform an action, then the action is not performed. For example, a user that is detected to be a child may not be allowed to view certain content, make purchases over $20, etc.

In block 408, if the detected user is allowed to perform an action, the detected user is authenticated. And in block 410, the action is performed.

In various embodiments, a detected user that is authenticated may not need to continuously enter identifier data such as a password or PIN when an action is performed. Instead, the user may be automatically authenticated as the process may repeat as indicated by the dotted arrow of FIG. 4. In some embodiments, automatic authentication of a detected user may be set to be performed at regular time periods, for example, every 15 minutes, 30 minutes, etc.

In an example where the action performed includes streaming content to a user that is detected to be an adult, the system may be set to automatically authenticate the detected user to continue performing the action without the user having to enter identifier data. In another example where the action performed includes streaming content to a user that is detected to be an adult, but then at the next authentication period the user is detected to be a child for whom the streaming content may be inappropriate, the action may be automatically stopped. In further embodiments, different authentication may be required depending on the detected user. For example, one detected user may be authenticated and allowed to perform certain actions such as making purchases over a certain amount (e.g., over $500), while another detected user (adult or child) may be required to be authenticated (e.g. recognized or required to enter identifier data) to make purchases over a certain amount, or may even be barred from making purchases at all.

A specific object used by a user may have specific contact characteristics on a user input interface, for example, pressure, touch, tap or swipe by the object may be harder or gentler (and thus produce a larger or smaller contact patch). In embodiments herein, the user device may run background processes to look for overall patterns to determine contact patch pattern information, for example, to determine average and median contact patch sizes, the largest contact patch, what the overall patterns look like in a multi-touch gesture versus a single finger gesture, etc.

In embodiments where an overall pattern shifts too far, especially, for example after a screen is unlocked, after a period of non-use, etc., a processor may use this pattern shift as an input to decide whether to require a more rigorous identification check or authentication of the user before allowing certain user actions to take place such as purchases, proceeding with a program, or using certain features. Advantageously, the user device may process or run background or continuous authentication of a user based on the overall patterns.

In various embodiments, the system may detect a "different" user even when that same user is the one who is first detected using the device in the session. That is, the system may detect that a user that first started using the user device is not the primary user (e.g., the owner of the user device) and alter the user device settings accordingly. For example, a child may have accessed a parent's device, such as by entering the device lock code, or simply through using an unprotected (e.g., no lock screen or passcode) device. In that case, the system may determine, such as described above, that the user is not the one associated with or the primary user of the device or that the user is only limited to certain content as specified by the primary device user.

Figure 5:
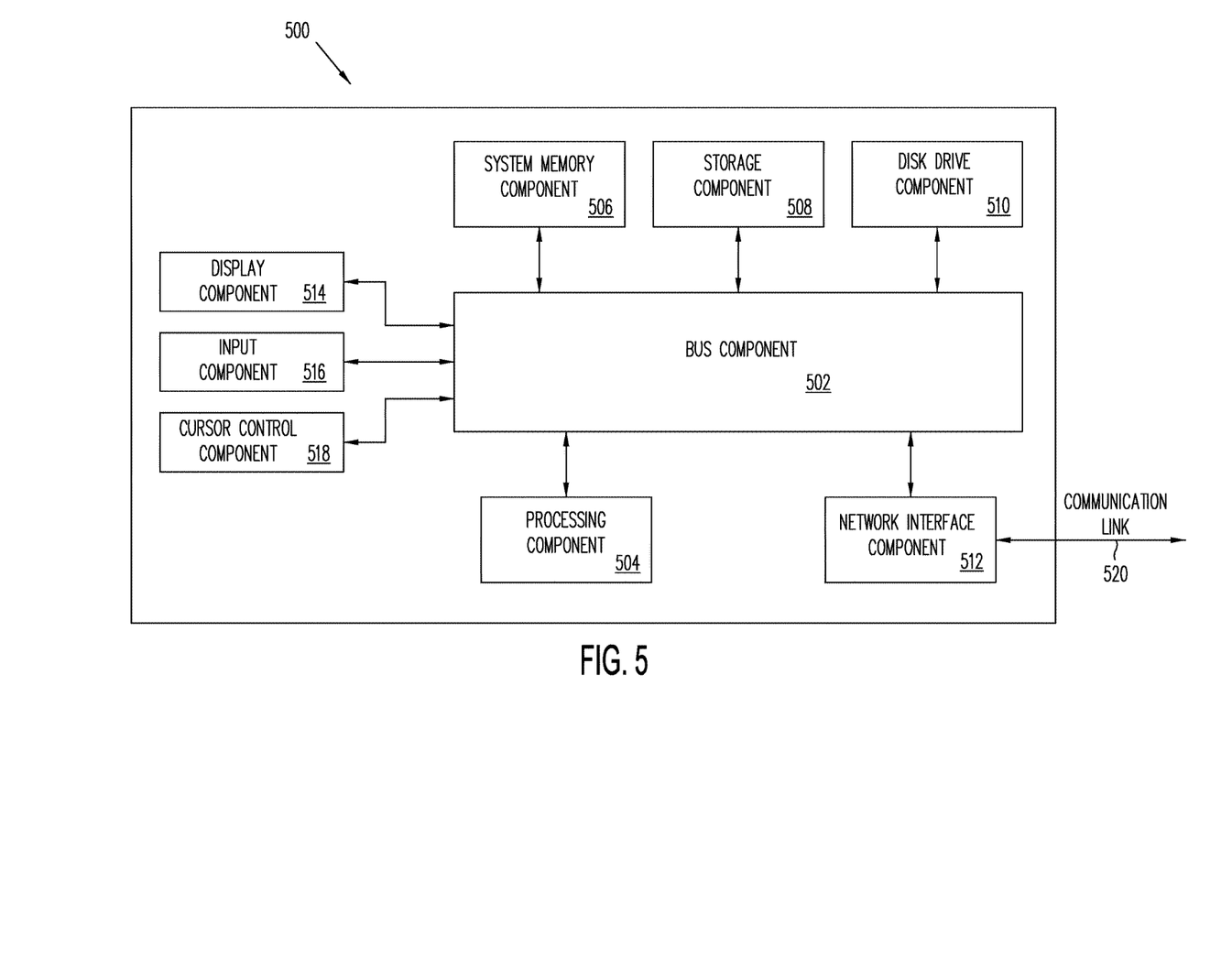
FIG. 5 is a block diagram of a system suitable for implementing one or more embodiments of the present disclosure.

Referring now to FIG. 5, a block diagram of a system 500 is illustrated suitable for implementing embodiments of the present disclosure, including user device 102 and a remote location server or device. System 500, such as part of a cell phone, a smart phone, a tablet, a personal computer and/or a network server, includes a bus 502 or other communication mechanism for communicating information, which interconnects subsystems and components, including one or more of a processing component 504 (e.g., processor, micro-controller, digital signal processor (DSP), etc.), a system memory component 506 (e.g., RAM), a static storage component 508 (e.g., ROM), a network interface component 512, a display component 514 (or alternatively, an interface to an external display), an input component 516 (e.g., keypad, keyboard, touchpad, voice input, etc.), and a cursor control component 518 (e.g., a mouse pad).

In accordance with embodiments of the present disclosure, system 500 performs specific operations by processor 504 executing one or more sequences of one or more instructions contained in system memory component 506. Such instructions may be read into system memory component 506 from another computer readable medium, such as static storage component 508. These may include instructions to detect users of user devices, authenticate users and/or alter or adjust settings, process financial transactions, make payments, etc. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 504 for execution. Such a medium may take many forms, including but not limited to, non-volatile media, volatile media, and transmission media.

In various implementations, volatile media includes dynamic memory, such as system memory component 506, and transmission media includes coaxial cables, copper wire, and fiber optics, including wires that comprise bus 502. Memory may be used to store visual representations of the different options for searching, auto-synchronizing, making payments or conducting financial transactions. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 500. In various other embodiments, a plurality of systems 500 coupled by communication link 520 (e.g., network 160 of FIG. 1, LAN, WLAN, PTSN, or various other wired or wireless networks) may perform instruction sequences to practice the disclosure in coordination with one another. Computer system 500 may transmit and receive messages, data, information and instructions, including one or more programs (i.e., application code) through communication link 520 and communication interface 512. Received program code may be executed by processor 504 as received and/or stored in disk drive component 510 or some other non-volatile storage component for execution.

In view of the present disclosure, it will be appreciated that various methods and systems have been described according to one or more embodiments for detecting a user using a user device and intelligently altering user device settings.

Although various components and steps have been described herein as being associated with user device 102 of FIGS. 1 and 2, it is contemplated that the various aspects of such device illustrated in FIGS. 1 and 2 may be distributed among a plurality of servers, devices, and/or other entities.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. It is contemplated that various alternate embodiments and/or modifications to the present disclosure, whether explicitly described or implied herein, are possible in light of the disclosure. For example, although certain user actions have been described according to one or more embodiments, it should be understood that the present disclosure may also apply to other user actions where requests for information, requests for access, or requests to perform certain transactions may be involved.

Having thus described embodiments of the disclosure, persons of ordinary skill in the art will recognize that changes may be made in form and detail without departing from the scope of the disclosure. Thus the disclosure is limited only by the claims.

What is claimed is:

1. A system comprising:
   a non-transitory memory; and
   one or more hardware processors coupled to the non-transitory memory and configured to read instructions from the non-transitory memory to cause the system to perform operations comprising:
      determining first user operation data corresponding to a first user operating a user device during a first time period while the user device is in an unlocked state, wherein the first user operation data is determined based on first sensor data generated by a sensor of a touchscreen of the user device responsive to the first user contacting the touchscreen during the first time period, wherein the first user device is configured to authenticate the first user according to a first authentication setting;
      deriving a first pattern of operating the user device based on the first user operation data;
      determining second user operation data corresponding to a second user operating the user device during a second time period while the user device is in the unlocked state, wherein the second user operation data is determined based on second sensor data generated by the sensor of the touchscreen responsive to the second user contacting the touchscreen during the second time period;
      deriving a second pattern of operating the user device based on the second user operation data;
      detecting that a difference between the first pattern and the second pattern exceeds a threshold; and
      in response to the detecting, configuring the user device to authenticate the second user according to a second authentication setting, wherein the second authentication setting has a higher security than the first authentication setting.

2. The system of claim 1, wherein deriving the first pattern comprises determining at least one of a first fingertip contact size pattern or a first contact pressure pattern associated with the first user based on the first sensor data, wherein deriving the second pattern comprises determining at least one of a second fingertip contact size pattern or a second contact pressure pattern associated with the second user based on the second sensor data, and wherein the detecting comprises at least one of comparing the first fingertip contact size pattern with the second fingertip contact size pattern or comparing the first contact pressure pattern with the second contact pressure pattern.

3. The system of claim 1,
   wherein the second pattern comprises a fingertip contact size pattern and a contact pressure pattern,
   wherein the operations further comprise analyzing the fingertip contact size pattern and the contact pressure pattern, and wherein the configuring the user device is in response to determining at least one of the fingertip contact size pattern is below a size threshold or the contact pressure pattern is below a pressure threshold.

4. The system of claim 1, wherein the operations further comprise in response to the detecting, altering an access level setting of the user device, wherein the altering comprises at least one of restricting access to one or more applications or restricting access to one or more types of content.

5. The system of claim 1, wherein the operations further comprise:
comparing the second pattern against a third pattern associated with a primary user of the user device; and
determining whether the second user is the primary user based on the comparing,
wherein the user device is configured further based on determining the second user is not the primary user.

6. The system of claim 1, wherein the operations further comprise:
receiving an image of the second user captured by a camera of the user device during the second time period; and
performing an image recognition algorithm on the image to determine an identity of the second user,
wherein the user device is configured further based on the determined identity of the second user.

7. The system of claim 1, wherein the operations further comprise:
receiving, from the user device subsequent to the second time period, a request to perform a transaction; and
in response to receiving the request, causing the user device to authenticate the second user according to the second authentication setting.

8. The system of claim 7, wherein the first authentication setting enables the first user to perform a transaction via the user device without providing additional authentication input, and wherein causing the user device to authenticate the second user according to the second authentication setting comprises causing the user device to prompt the second user for a password.

9. A method, comprising:
determining, by one or more hardware processors, first user operation data corresponding to a first user operating a user device during a first time period while the user device is in an unlocked state, wherein the first user operation data is determined based on first sensor data generated by a sensor of a touchscreen of the user device responsive to the first user contacting the touchscreen during the first time period, wherein the first user device is configured to authenticate the first user according to a first authentication setting;
deriving, by the one or more hardware processors, a first pattern of operating the user device based on the first user operation data;
determining, by the one or more hardware processors, second user operation data corresponding to a second user operating the user device during a second time period while the user device is in the unlocked state, wherein the second user operation data is determined based on second sensor data generated by the sensor of the touchscreen responsive to the second user contacting the touchscreen during the second time period;
deriving, by the one or more hardware processors, a second pattern of operating the user device based on the second user operation data;
determining, by the one or more hardware processors, a difference between the first pattern and the second pattern; and
configuring, by the one or more hardware processors, the user device to authenticate the second user according to a second authentication setting based on the difference, wherein the second authentication setting is different than the first authentication setting.

10. The method of claim 9,
wherein deriving the first pattern comprises determining at least one of a first fingertip contact size or a first contact pressure based on the first sensor data;
wherein deriving the second pattern comprises determining at least one of a second fingertip contact size or a second contact pressure based on the second sensor data, and
wherein determining the difference comprises at least one of comparing the first fingertip contact size with the second fingertip contact size or comparing the first contact pressure with the second contact pressure.

11. The method of claim 9,
wherein the second pattern comprises a fingertip contact size and a contact pressure, and
wherein the user device is configured further based on determining at least one of the fingertip contact size is below a size threshold or the contact pressure is below a pressure threshold.

12. The method of claim 9, further comprising altering an access level setting of the user device based on the difference, wherein the altering comprises at least one of restricting access to one or more applications or restricting access to one or more types of content.

13. The method of claim 9, further comprising:
comparing the second pattern against a third pattern associated with a primary user operating the user device; and
determining whether the second user is the primary user based on the comparing,
wherein the user device is configured further based on determining the second user is not the primary user.

14. The method of claim 9, further comprising:
receiving an image of the second user captured by a camera of the user device during the second time period,
wherein the user device is configured further based on the image of the second user.

15. The method of claim 9, further comprising:
receiving, from the user device subsequent to the second time period, a request to perform a transaction; and
in response to receiving the request, causing the user device to authenticate the second user according to the second authentication setting.

16. A non-transitory machine-readable medium having stored thereon machine-readable instructions executable to cause a machine to perform operations comprising:
determining first user operation data corresponding to a first user operating a user device during a first time period while the user device is in an unlocked state, wherein the first user operation data is determined based on first sensor data generated by a sensor of a touchscreen of the user device responsive to the first user contacting the touchscreen during the first time period, wherein the first user device is configured to authenticate the first user according to a first authentication setting;
deriving a first pattern of operating the user device based on the first user operation data;

determining second user operation data corresponding to a second user operating the user device during a second time period while the user device is in the unlocked state, wherein the second user operation data is determined based on second sensor data generated by the sensor of the touchscreen responsive to the second user contacting the touchscreen during the second time period;

deriving a second pattern of operating the user device based on the second user operation data;

determining a difference between the first pattern and the second pattern; and configuring the user device to authenticate the second user according to a second authentication setting based on the difference, wherein the second authentication setting has a higher security than the first authentication setting.

17. The non-transitory machine-readable medium of claim 16, wherein deriving the first pattern comprises determining at least one of a first fingertip contact pattern or a first pressure pattern based on the first sensor data, wherein deriving the second pattern comprises determining at least one of a second fingertip contact pattern or a second pressure pattern, and wherein the detecting comprises at least one of comparing the first fingertip contact pattern with the second fingertip contact pattern or comparing the first pressure pattern with the second pressure pattern.

18. The non-transitory machine-readable medium of claim 16, wherein the second pattern comprises a contact pressure pattern, wherein the operations further comprise:
    determining the contact pressure pattern is below a pressure threshold,
    wherein the configuring the user device is performed automatically in response to the determining.

19. The non-transitory machine-readable medium of claim 16, wherein the operations further comprise altering an access level setting of the user device based on the difference, wherein the altering comprises at least one of restricting access to one or more applications or restricting access to one or more types of content.

20. The non-transitory machine-readable medium of claim 16, wherein the operations further comprise:
    comparing the second pattern against a third pattern associated with a primary user of the user device; and
    determining whether the second user is the primary user based on the comparing,
    wherein the user device is configured further based on determining the second user is not the primary user.

* * * * *